United States Patent [19]

Clarridge

[11] 4,167,257

[45] Sep. 11, 1979

[54] TAPE DECK CAPSTAN SHIFTING APPARATUS

[75] Inventor: Glenn E. Clarridge, Portland, Oreg.

[73] Assignee: Ford Industries, Inc., Portland, Oreg.

[21] Appl. No.: 898,911

[22] Filed: Apr. 21, 1978

[51] Int. Cl.² .............................................. G03B 1/04
[52] U.S. Cl. .................................... 242/201; 242/206
[58] Field of Search .................... 242/180, 200–204, 242/210; 360/73, 74

[56] References Cited

U.S. PATENT DOCUMENTS

| 3,610,553 | 10/1971 | Matsuyama | 242/201 |
| 3,758,049 | 9/1973 | Staar | 242/201 |
| 4,029,269 | 6/1977 | Clarridge | 242/201 |

Primary Examiner—Leonard D. Christian

Attorney, Agent, or Firm—Kolisch, Hartwell, Dickinson & Stuart

[57] ABSTRACT

A tape drive shifting apparatus designed for remote controlled shifting among positions effecting forward, rapid-forward, and rapid-rewind movement of a length of recording tape. A first drive mechanism is shiftable into and out of a position effecting forward tape movement. A second drive mechanism is shiftable from a neutral position into and out of positions effecting rapid-forward and rapid-rewind tape movement. A pivot arm operatively interposed between the two drive mechanisms causes the first mechanism to shift away from its position effecting tape movement upon shifting of the second mechanism from its neutral position toward one of its positions effecting rapid tape movement.

7 Claims, 3 Drawing Figures

TAPE DECK CAPSTAN SHIFTING APPARATUS

BACKGROUND AND SUMMARY

The following invention relates to a tape drive apparatus, and in particular, to such an apparatus which is especially adapted for use in a telephone answering device and like equipment, where shifting among the various tape drive modes may be accomplished by remote control.

In a conventional telephone answering device, two different recording tapes may be used. One of these is referred to generally as an announcement tape, and the other as a message tape. The announcement tape is usually a short tape on which the owner of the answering device records a message which he wishes to have played out to a calling party. The message tape is generally a considerably longer tape onto which a calling party is invited to record a message. Typically, each of the tapes is supported between a pair of spools mounted on a main deck, with movement of a tape being produced by engagement of a rotary-driven spindle with an appropriate tape spool.

In the applicant's U.S. Pat. No. 4,029,269, there is disclosed a tape drive shifting apparatus designed for use with tape recording apparatus generally of the above-described type. The apparatus disclosed therein includes a pair of drive spindles mounted on a subdeck for shifting therewith relative to a main deck. Movement of the subdeck is so constrained that translation of the subdeck to carry one of the drive spindles into a position effecting rapid movement (forward and reverse) of the message tape, produces a simultaneous pivoting of the subdeck, carrying the other drive spindle away from a position effecting forward movement of the same tape.

In the present invention, there is disclosed a novel tape drive shifting apparatus for use with a telephone answering service tape recorder of the type described above. The apparatus includes a drive spindle which is mounted on a horizontally shiftable subdeck for movement therewith into and out of positions effecting forward movement of the announcement and the message tape. The subdeck mounting this spindle is biased toward a nominal position in which the spindle effects forward movement of the message tape. Two other spindles are mounted on a second subdeck for movement therewith from neutral positions toward different positions, respectively, effecting rapid-forward and rapid-rewind tape movement of the message tape. A pivot arm operatively interposed between the two subdecks causes the first subdeck to shift away from its nominal position upon shifting of the second subdeck to place either of the second-mentioned spindles in a position causing rapid movement of the same tape.

As will become apparent, the present invention offers a number of unique advantages not heretofore available in apparatus of the type generally outlined.

One important object of the present invention is to provide a novel tape drive shifting apparatus designed for remote controlled shifting among positions effecting forward, rapid-forward, and rapid-rewind movement of a length of recording tape.

Another object of the invention is to provide such an apparatus in which a first drive mechanism effecting driving movement of a length of recording tape, and a second drive mechanism effecting rapid-forward and rapid-rewind movement of the same tape, are movable relative to one another.

Yet another object of the invention is to provide such an apparatus which is relatively simple in construction and operation.

Still a further object of the invention is to provide an apparatus permitting a greater design flexibility than has been afforded by prior art tape shifting devices.

DRAWINGS

These and other objects and features of the present invention will now be more fully described with reference to the following detailed description of a preferred embodiment thereof, and the accompanying drawings, wherein.

DETAILED DESCRIPTION OF A PREFERRED EMBODIMENT OF THE INVENTION

Figure 1:
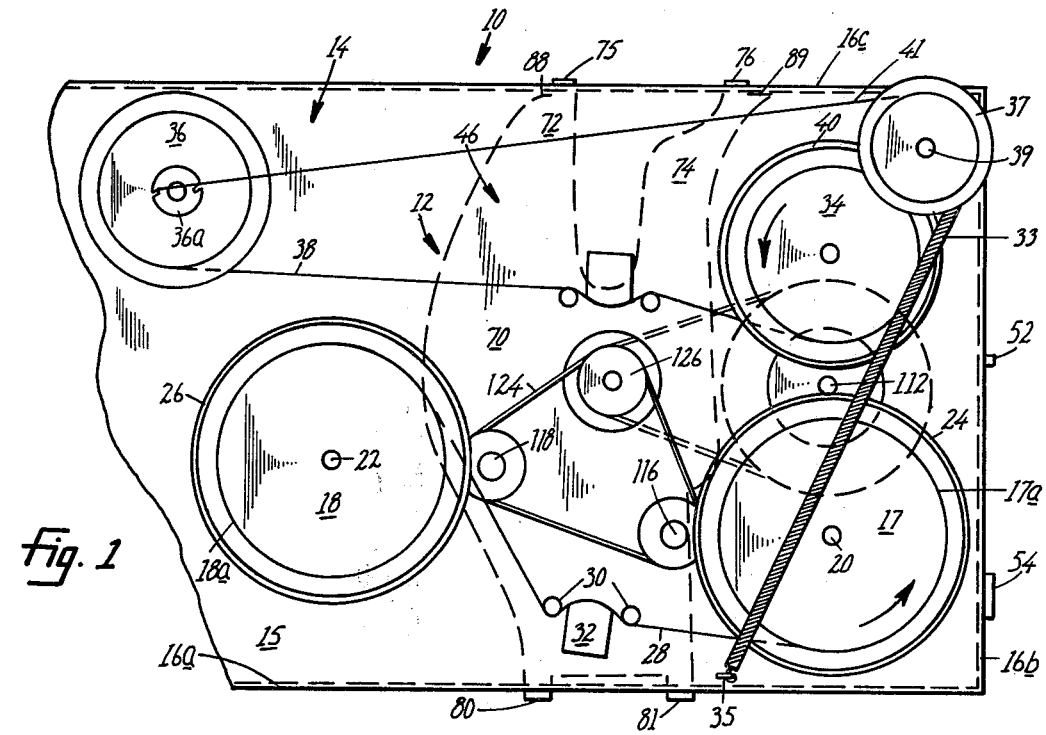
FIG. 1 is a fragmentary, somewhat schematic plan view, with certain portions broken away, illustrating a tape drive shifting apparatus as contemplated by the present invention used in the setting of an otherwise conventional telephone answering device.

Considering now FIG. 1, indicated generally and fragmentarily at 10 is a portion of a telephone answering device including a tape drive apparatus 12, which is constructed in accordance with the present invention. Apparatus 12 is mounted on a frame 14, which is preferably constructed of sheet metal, and which includes a generally planar main deck 15 formed with right-angularly disposed walls, such as walls 16a, 16b, 16c, which project away from the plane of FIG. 1.

Mounted on main deck 15 is a tape support, or transport, means generally including a pair of spools, or rotary elements, shown 17, 18—the latter acting as a supply spool for a length of incoming-message-recording tape, and the former acting as a take-up spool for this tape. Spools 17, 18, which are rotatably mounted on deck 15 through spindles 20, 22, respectively, include hubs 17a, 18a, respectively, for supporting tape. Suitably mounted on the outside of spools 17, 18 are conventional rubber tires 24, 26, respectively, through which drive is imparted to these spools, as will be explained.

Extending between spools 17, 18 is a magnetic recording tape, shown generally at 28. As can be seen, tape 28 extends between the spools over a pair of idlers 30, between which is located a conventional record-erase-playback head 32. Rotation of spool 17 in a counterclockwise direction, as viewed in FIG. 1, transports tape 28 in a generally left-to-right (forward) direction. Similarly, rotation of spool 18 in a counterclockwise direction causes tape movement in the reverse direction.

A second tape support mechanism seen in FIG. 1 generally includes a pair of spools 34, 36, supporting for movement therebetween, an outgoing announcement tape 38. Rotation of spool 34 in a counterclockwise direction moves tape 38 in a generally left-to-right (forward) direction. Such rotation is imparted to spool 34 through a tire 40 suitably mounted thereon. A spring 33 functions to drive tape 38 in the reverse direction. One end of this spring is anchored to the main deck at 35 and the spring is trained around a pulley 37 pivoted at 39 also on the main deck. The opposite end of the spring connects through a line 41 with an axial spool projection 36a that forms part of spool 36.

Figure 2:
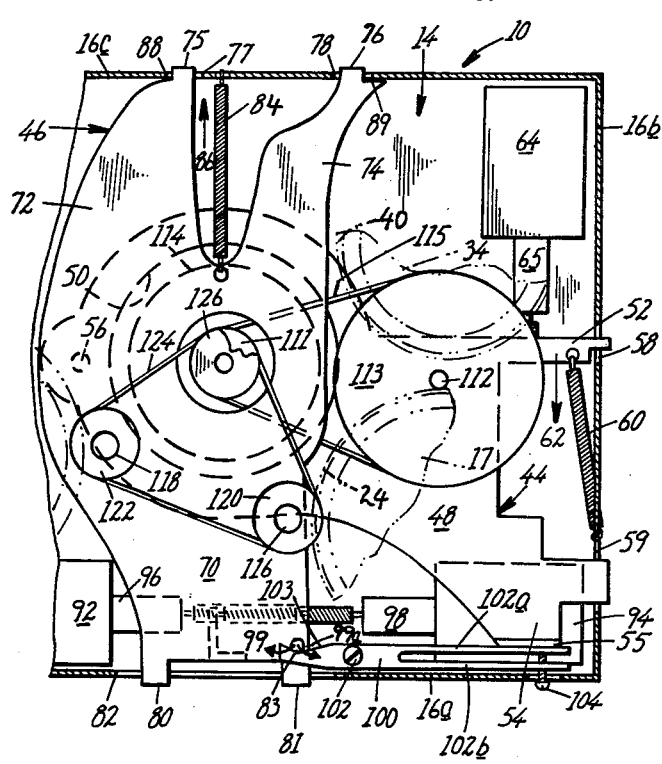
FIG. 2 is a fragmentary, plan view of the apparatus, with the main deck and portions of the supporting walls cut away.

Referring now to FIG. 2, which shows a portion of device 10 with main deck 15 and portions of walls 16a, 16b, 16c cut away, there is seen a pair of plates, or subdecks 44, 46 mounted on frame 14. Main deck 15 and subdecks 44, 46 occupy substantially parallel planes with subdeck 46 lying between main deck 15, and subdeck 44. As will soon be described, the two subdecks are mounted for horizontal shifting in their planes.

Subdeck 44, also referred to herein as a first subdeck, generally includes a body 48 having a circular opening 50 therein, a pair of legs 52, 54, and a finger 55, seen end-on in FIG. 2, projecting toward the viewer from the plane of the drawing. The subdeck is pivotally mounted on frame 14 through a pivot connection 56, with the ends of legs 52, 54 being slidably received within slots 58, 59, respectively, in wall 16b. A spring, or biasing means, 60 connects wall 16b with leg 52, urging subdeck 44 in the direction indicated by arrow 62. Shifting means for shifting subdeck 44 in the direction opposite that indicated by arrow 62 generally includes a frame-mounted solenoid 65 having an extendible/retractable piston 65 connected to leg 52, as seen in FIG. 2.

Subdeck 46, also referred to herein as a second subdeck, generally includes a body 70 having legs 72, 74. Subdeck 46 is shiftably mounted on frame 14 by a pair of leg-end projections 75, 76 which are slidably supported within slots 77, 78, respectively, in wall 16c, and by a pair of body-end projections 80, 81 slidably supported within an elongate slot 82, in wall 16a. Projecting toward the viewer from subdeck 46 adjacent projection 81 is a pin, or actuating member 83, the purpose of which is described below.

Biasing means generally including a spring 84 connecting wall 16c with subdeck 46 urges the subdeck in the direction indicated by arrow 86, wherein the leg-end portions 88, 89 of legs 74, 74 adjacent projections 75, 76, respectively, are urged against the inner side of wall 16c, adjacent slots 77, 78, respectively. Spring 84 urges subdeck 46 toward the position shown in FIG. 2. Leg-end portions 88, 89 constitute a pair of spaced-apart, rock-effecting portions contactable with frame 14. A pair of frame-mounted solenoids 92, 94, having extendible/retractable pistons 96, 98 interconnect subdeck 46 and frame 14. Retraction of piston 96 produces a rocking movement of subdeck 46 in a clockwise direction in FIG. 2 with portion 88 reacting against wall 16c. This action moves pin 83 in the direction indicated by arrow 99 in FIG. 2. Retraction of piston 98 produces a rocking movement of subdeck 46 in the opposite direction with portion 89 reacting against wall 16c. This action moves pin 83 in the direction indicated by arrow 99a in FIG. 2. Such activity is referred to herebelow as bimodal rocking.

Figure 3:
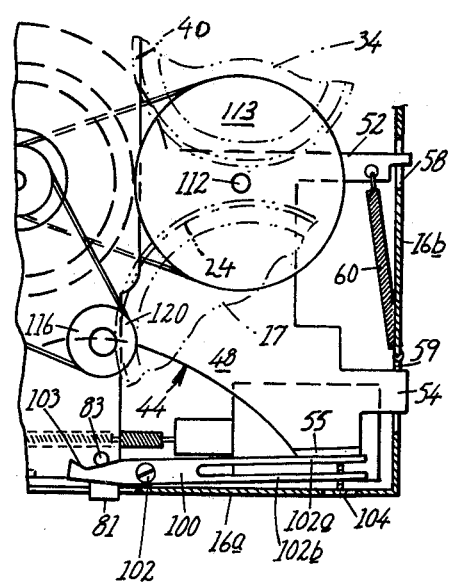
FIG. 3 is a fragmentary portion of the apparatus seen in FIG. 2, shown here shifted to a position effecting fast-forward movement of a message tape.

Coupling means operatively interposed between subdecks 44, 46, which means is adapted to produce movement of the former upon movement of the latter, generally includes a pivot arm 100 shown in FIGS. 2 and 3. Arm 100 is pivotally attached to main deck 15 at 102 for pivoting in a plane substantially paralleling those of the subdecks. The left end of arm 102 in FIGS. 2 and 3 is formed with a recess 103 that defines a double cam surface. The right end of the arm in these figures is bifurcated to include a pair of legs 102a, 102b. An adjustment screw 104 is threaded through a suitable accommodating bore in leg 102b, with the inner end of the screw acting against leg 102a. Adjustment of screw 104 determines the spread between legs 102a, 102b to produce a condition which will now be described.

With the various parts in the apparatus in the positions shown therefore in FIG. 2, pin 83 seats in what might be thought of as the deepest or most recessed portion of recess 103. Screw 104 is adjusted to produce that spread between legs 102a, 102b which causes leg 102a to contact finger 55.

Journaled on subdeck 44 is a drive spindle 112 which projects toward the viewer in FIGS. 2 and 3 beyond the plane of main deck 15, and adjacent spools 17, 34. Spindle 112 forms part of a wheel 113 which is rotatably coupled to a drive motor 114 through an endless belt 115. Belt 115 is trained over wheel 113 and about pulley 111 which is mounted on the motor's drive shaft. Motor 114 is rigidly mounted on frame 14, and extends away from the viewer in FIG. 2 through clearance opening 50 in subdeck 44. Spindle 112 is referred to herein as first drive means.

With subdeck 44 biased as explained in the direction indicated by arrow 62, spindle 112 engages tire 24 on spool 17, thereby to impart rotation to spool 17 in a direction opposite the direction of rotation of motor 114, as indicated by the arrow on the spool in FIG. 1. This rotation is effective to transport tape 28 in a forward direction at recording/playback speed. Upon actuation of solenoid 64, subdeck 44 pivots about pivot connection 56, and causes spindle 112 to engage tire 40 on spool 34, thus to impart rotation to spool 34, and advance tape 38, in a forward direction and at recording/playback speed.

Journaled on subdeck 46 are two spindles 116, 118, which project toward the viewer beyond the plane of main deck 15 adjacent spools 17, 18, respectively. Spindles 116, 118, carry pulleys 120, 122, respectively, which are coupled by an endless belt 124 to a pulley 126 on the motor's drive shaft. Spindles 116, 118 are referred to herein as a second drive means. It can be appreciated that both the first and second drive means are driven by motor 114.

Spindles 116, 118 move with subdeck 46 relative to spools 17, 18, selectively toward a rapid-forward driving engagement position, wherein spindle 116 engages tire 24 on spool 17, and toward another driving engagement position wherein spindle 118 engages tire 26 on spool 18. This movement is accomplished through actuation of solenoids 92, 94. The former position causes movement of tape 28 in a forward direction at a "fast-forward" speed, and the latter position causes the tape to move in the reverse direction, at a "fast-reverse" speed.

Explaining now how the special features of the instant invention perform, when answering device 10 is placed in a condition to receive and record an incoming message, the various components thereof depicted in the drawings occupy the positions shown generally therefore in FIGS. 1 and 2. Motor 114 is energized and spindle 112 drives message tape 28 in a forward direction and at the proper recording speed. In a conventional manner and one well known to those skilled in the art the incoming message is recorded on tape 28, and the same is stopped when the incoming message has ended and the telephone connection therefore broken. Similarly, when the owner of the device wishes to record a particular announcement to be played out to a calling party, the answering device is placed in a condition with motor 114 operating, the solenoid 64 energized, and spindle 112 driving tape 38 in a forward direction and at a recording speed. Rewind, of course, of the announcement tape occurs automatically with disengagement of tire 40 and spindle 112 through the action of spring 33.

Of special interest herein is the operation which occurs when the owner of device 10 wishes either to advance tape 28 in a fast-forward direction or in a fast-rewind direction. In the case of the former situation, and through suitable conventional controls provided in the answering device, solenoid 94 is energized to place spindle 116 in contact with tire 24 on spool 17. On this occurring, subdeck 46 rocks in a counterclockwise direction in FIG. 2 with portion 89 contacting or reacting against wall 16c and with pin 83 driving against the right side of recess 103 in FIG. 2. This action, and particularly the interaction between pin 83 and the right side of recess 103 causes counterclockwise pivoting of arm 100 in FIG. 2 which, in turn, and through engagement of leg 102a and finger 55, causes counterclockwise rocking of subdeck 44 in FIG. 2 about pivot connection 56. The pivoted-to position thus attained by subdeck 44 is shown in FIG. 3, wherein it will be noted that spindle 112 is lifted to a position of disengagement from tire 24. Thus, fast-forward operation of tape 28 is accomplished without any interfering contact between spindle 112 and tire 24.

Similarly, when fast-rewind is desired for tape 28 solenoid 92 is suitably energized to rock subdeck 46 in a clockwise direction in FIG. 2. It will be recalled that this rocking takes place with portion 88 in the subdeck reacting against wall 16c. This operation causes pin 83 to drive against the left side of recess 103, again causing counterclockwise rocking of arm 100 about pivot connection 102. Such rocking of arm 102 produces exactly the same effect just described with respect to lifting or shifting of spindle 112 away from a position of engagement with tire 24. Thus, rewinding of the message tape takes place without interfering contact between this spindle and tire.

Thus, and because of the unique arrangement of various parts proposed by the present invention, shifting of either spindle 116 or spindle 118 to a position of driving engagement with spools 17, 18, respectively, produces movement of spindle 112 out of its "normal" position of driving engagement with tire 24.

While a preferred embodiment of the invention has been described, it is appreciated that variations and modifications may be made without departing from the spirit of the invention.

It is claimed and desired to secure by Letters Patent:

1. Tape drive apparatus comprising
    tape transport means for supporting tape for reversible movement,
    first drive means mounted for movement into and out of a position of driving engagement relative to said transport means, operable, when in said position, to drive a supported tape in one direction and at one speed,
    second drive means mounted for movement relative to said transport means and to said first drive means, selectively toward one driving engagement position for driving a supported tape in said one direction at a speed different from said one speed, and toward another driving engagement position for driving such tape in the opposite direction, and
    coupling means operatively interposed between said first and second drive means adapted to produce movement of the former out of a position of driving engagement relative to said transport means with movement of the latter toward such a position, said coupling means including an arm operatively connected to one of said two drive means through means defining a double cam surface.

2. The apparatus of claim 1, wherein movement of said second drive means toward its said one and other driving engagement positions produces relative movement between it and said first drive means.

3. Tape drive apparatus comprising
    a main deck,
    tape support means mounted on said deck for supporting a length of recording tape for reversible movement, said support means including a pair of rotary elements, with one being drivable in a selected direction to transport supported tape in one direction, and the other being drivable in a selected direction to transport supported tape in the reverse direction,
    first and second subdecks, each mounted adjacent said main deck for shifting in a plane substantially parallel to that of said main deck,
    first drive means mounted on said first subdeck for movement therewith into and out of a position of driving engagement with said one rotary element, operable, when in such position, to drive said one element in its said selected direction and at one speed,
    second drive means mounted on said second subdeck for movement therewith selectively from a disengaged position toward one driving engagement position for driving said one rotary element in its said selected direction and at a speed greater than said one speed and toward another driving engagement position for driving said other element in its said selected direction, and
    coupling means operatively interconnecting said first and second subdecks for shifting said first subdeck away from a nominal position effecting driving engagement between said first drive means and said one element upon shifting of said second subdeck to place said second drive means in each of its said driving engagement positions.

4. The apparatus of claim 3 which further comprises first biasing means acting between said main deck and said first subdeck urging the latter subdeck toward its said nominal position.

5. The apparatus of claim 3, wherein said second subdeck includes means defining a pair of spaced-apart rock-effecting portions contactable with said main deck to produce bimodal rocking in the second setback as the same is shifted to place said second drive means in each of its said driving engagement positions.

6. The apparatus of claim 3 which further comprises second biasing means acting between said main deck and said second subdeck urging the latter toward a position in which said second drive means is in its said disengaged position.

7. The apparatus of claim 3, wherein said second subdeck includes an actuating member, and said coupling means includes a pivot arm pivotally mounted on said main deck and having a double cam surface slideably engaging said actuating member.

* * * * *